United States Patent
Zhou et al.

(10) Patent No.: US 11,184,096 B2
(45) Date of Patent: Nov. 23, 2021

(54) SERVICE TRANSMISSION METHOD, NETWORK DEVICE, AND NETWORK SYSTEM

(71) Applicant: HUAWEI TECHNOLOGIES CO., LTD., Shenzhen (CN)

(72) Inventors: Huiyu Zhou, Shenzhen (CN); Junling Xiang, Chengdu (CN); Limin Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 16/517,696

(22) Filed: Jul. 22, 2019

(65) Prior Publication Data
US 2019/0342022 A1 Nov. 7, 2019

Related U.S. Application Data

(63) Continuation of application No. PCT/CN2017/097547, filed on Aug. 15, 2017.

(30) Foreign Application Priority Data
Jan. 22, 2017 (CN) .......................... 201710057027.8

(51) Int. Cl.
*H04J 3/06* (2006.01)

(52) U.S. Cl.
CPC .......... *H04J 3/0661* (2013.01); *H04J 3/0632* (2013.01); *H04J 3/0679* (2013.01)

(58) Field of Classification Search
None
See application file for complete search history.

(56) References Cited

U.S. PATENT DOCUMENTS

| 9,882,634 | B1 * | 1/2018 | Al Sayeed | H04L 43/50 |
| 10,200,248 | B1 * | 2/2019 | Jiang | H04L 41/22 |
| 2010/0209107 | A1 | 8/2010 | Yin | |
| 2011/0019681 | A1 | 1/2011 | Gazier et al. | |

(Continued)

FOREIGN PATENT DOCUMENTS

| CN | 101489157 A | 7/2009 |
| CN | 102196321 A | 9/2011 |

(Continued)

OTHER PUBLICATIONS

Stephen J. Trowbridge et al., "Flex Ethernet Implementation Agreement 1.0. IA#OIF-FLEXE-01.0", Mar. 1, 2016, pp. 1-31, XP055509044.

*Primary Examiner* — Phirin Sam
(74) *Attorney, Agent, or Firm* — Maier & Maier, PLLC

(57) ABSTRACT

The present invention discloses a service transmission method, a network device, and a network system. The method includes: obtaining, by a first network device, a client service of FlexE, and obtaining clock information corresponding to the client service; mapping, by the first network device, the client service and the clock information to a timeslot of a FlexE frame, where the client service and the clock information occupy a same timeslot and/or different timeslots; and sending, by the first network device, the FlexE frame to a second network device. Therefore, service clock information can be transparently transmitted in flexible Ethernet by using the method of the present invention.

16 Claims, 6 Drawing Sheets

(56) References Cited

U.S. PATENT DOCUMENTS

2014/0308037 A1* 10/2014 Hu .................... H04J 14/086
                                                                 398/47
2016/0007104 A1    1/2016  Chen et al.
2016/0197691 A1    7/2016  Su et al.
2017/0005949 A1    1/2017  Gareau
2017/0006360 A1*   1/2017  Gareau ................ G06F 13/40
2017/0324657 A1   11/2017  Zhong
2017/0366255 A1*  12/2017  Sharma ............. H04Q 11/0005

FOREIGN PATENT DOCUMENTS

| CN | 103533464 A | 1/2014 |
| CN | 103688499 A | 3/2014 |
| CN | 103825668 A | 5/2014 |
| CN | 105323053 A | 2/2016 |
| EP | 3113502 A1 | 1/2017 |
| WO | 2016115927 A1 | 7/2016 |

\* cited by examiner

SERVICE TRANSMISSION METHOD, NETWORK DEVICE, AND NETWORK SYSTEM

CROSS-REFERENCE TO RELATED APPLICATIONS

This application is a continuation of International Application No. PCT/CN2017/097547, filed on Aug. 15, 2017, which claims priority to Chinese Patent Application No. 201710057027.8, filed on Jan. 22, 2017. The disclosures of the aforementioned applications are hereby incorporated by reference in their entireties.

TECHNICAL FIELD

The present invention relates to the field of communications technologies, and in particular, to a service transmission method, a network device, and a network system.

BACKGROUND

Flexible Ethernet (FlexE) combines some technical features of Ethernet and a transport network (for example, an optical transport network (OTN) and a synchronous digital hierarchy (SDH)), and is an important landmark of evolved Ethernet technologies. As flexible Ethernet technologies appear, an Ethernet physical interface has a virtualization feature. A plurality of Ethernet physical interfaces may be cascaded to support several virtual logical ports. For example, a flexible Ethernet physical interface group of 400 gigabits (G) obtained by cascading four Ethernet (100 Gigabit Ethernet, 100 GE) physical interfaces of 100 gigabits can support several logical ports.

An Ethernet physical interface is an asynchronous communications interface, and allows a positive or negative clock rate difference of 100 ppm (parts per ten million). For example, in 10 GE, for two physical interfaces whose nominal bandwidths are 10 G, a bandwidth of one physical interface may be greater than the nominal value by parts per ten thousands, and a bandwidth of the other physical interface is less than the nominal value by parts per ten thousands, that is, are respectively $10\ G*(1+0.0001)$ and $10\ G*(1-0.0001)$. A clock rate of a logical port inherits the clock rate feature of the physical interface, and also has a deviation of 100 ppm. For example, for logical ports whose nominal bandwidths are 25 G on two different physical interfaces or in two physical interface groups, actual bandwidths may be approximately $25\ G*(20460/20461)*(1+0.0001)$ and $25\ G*(20460/20461)*(1-0.0001)$ except overheads of timeslot division and timeslot management in flexible Ethernet. When flexible Ethernet carries a service, an idle code block (Idle) needs to be added or deleted hop by hop, so that a service rate is adapted to a bandwidth rate deviation between physical interfaces or logical ports. FIG. 1 is a schematic diagram of service transmission in flexible Ethernet in the prior art. As shown in FIG. 1, a client device Ca needs to send a service to a client device Cb, and Ca and Cb may transmit the service by using a bearer network. For example, flexible Ethernet formed by a plurality of FlexE clients (for example, Pa, Pb, and Pc) is used as a bearer network. The client device may be a device such as a router or a switch. When a service between the client devices Ca and Cb is carried by using the FlexE clients Pa, Pb, and Pc, an idle code block needs to be added or deleted on Pa, Pb, and Pc.

However, adding or deleting of an idle code block causes loss of service clock information (including clock rate and time phase information), that is, the service clock information cannot be transparently transmitted.

SUMMARY

Embodiments of the present invention provide a service transmission method, a network device, and a network system, so that service clock information in flexible Ethernet can be transparently transmitted.

According to a first aspect, an embodiment of the present invention provides a service transmission method. The method includes: obtaining, by a first network device, a client service of FlexE, and obtaining clock information corresponding to the client service; mapping, by the first network device, the client service and the clock information to a timeslot of a FlexE frame, where the client service and the clock information occupy a same timeslot and/or different timeslots; and sending, by the first network device, the FlexE frame to a second network device.

In this embodiment of the present invention, the first network device obtains the clock information of the client service, and maps the client service and the clock information of the client service to the FlexE frame. Therefore, after receiving the FlexE frame, the second network device may obtain, from the FlexE frame, the client service and the clock information corresponding to the client service, and adjust a recovered clock based on the clock information, so that the recovered clock approaches an original clock of the client service. Therefore, the client service is adapted from a clock of the FlexE frame to the original clock of the client service, so that the client service is efficiently carried in the FlexE frame, and the clock information is transparently transmitted.

In a possible design, that the client service and the clock information occupy a same timeslot includes: the client service occupies a first code block of the timeslot, the clock information occupies a second code block of the timeslot, and the first code block and the second code block are indicated by using code block indication information. In this embodiment of the present invention, the first network device may randomly select the second code block to transmit the clock information of the client service, and notify the second network device of a location of the second code block by using the code block indication information, so that the second network device can find the second code block and obtain the clock information of the client service from the second code block.

In a possible design, the code block indication information may be carried in an overhead code block of the FlexE frame.

In a possible design, that the client service and the clock information occupy a same timeslot includes: the client service and the clock information occupy a same code block of the same timeslot; and that the client service and the clock information occupy a same code block of the same timeslot includes: the client service occupies a first bit of the code block, the clock information occupies a second bit of the code block, and the first bit and the second bit are indicated by using bit indication information. In this embodiment of the present invention, the client service and the clock information of the client service may be carried in a same code block and occupy different bits. The first network device notifies the second network device of the bit occupied by the client service and the bit occupied by the clock information by using the bit indication information, so that the second network device can obtain the clock information of the client service.

In a possible design, the bit indication information may be carried in an overhead code block of the FlexE frame.

In a possible design, that the client service and the clock information occupy different timeslots includes: the client service occupies a first timeslot, the clock information occupies a second timeslot, and the first timeslot and the second timeslot are indicated by using timeslot indication information. In this embodiment of the present invention, the first network device may randomly select the second timeslot to transmit the clock information of the client service, and notify the second network device of a location of the second timeslot by using the timeslot indication information, so that the second network device can find the second timeslot and obtain the clock information of the client service from the second timeslot.

In a possible design, the timeslot indication information may be carried in an overhead code block of the FlexE frame.

In a possible design, the obtaining clock information corresponding to the client service includes: obtaining a code block of the clock information, where a format of the code block includes any one of 64B/66B encoding, 8B/10B encoding, and 254B/256B encoding.

In a possible design, a period of obtaining the clock information corresponding to the client service is the same as a period of mapping the clock information to the timeslot of the FlexE frame.

According to a second aspect, an embodiment of the present invention provides a service transmission method. The method includes: receiving, by a second network device, a FlexE frame sent by a first network device, where a timeslot of the FlexE frame includes a client service of FlexE and clock information corresponding to the client service, and the client service and the clock information occupy a same timeslot and/or different timeslots; obtaining, by the second network device, the client service and the clock information from the FlexE frame; and adjusting, by the second network device, a recovered clock based on the clock information, and adapting the client service to the recovered clock.

In this embodiment of the present invention, the first network device obtains the clock information of the client service, and maps the client service and the clock information of the client service to the FlexE frame. Therefore, after receiving the FlexE frame, the second network device may obtain, from the FlexE frame, the client service and the clock information corresponding to the client service, and adjust a recovered clock based on the clock information, so that the recovered clock approaches an original clock of the client service. Therefore, the client service is adapted from a clock of the FlexE frame to the original clock of the client service, so that the client service is efficiently carried in the FlexE frame, and the clock information is transparently transmitted.

In a possible design, the client service and the clock information occupy a same timeslot, and the obtaining, by the second network device, the client service and the clock information from the FlexE frame includes: obtaining, by the second network device, the client service from a first code block in the timeslot, and obtaining the clock information from a second code block in the timeslot based on code block indication information. In this embodiment of the present invention, the first network device may randomly select the second code block to transmit the clock information of the client service, and notify the second network device of a location of the second code block by using the code block indication information, so that the second network device can find the second code block and obtain the clock information of the client service from the second code block.

In a possible design, the code block indication information may be carried in an overhead code block of the FlexE frame.

In a possible design, the client service and the clock information occupy a same code block in a same timeslot, and the obtaining, by the second network device, the client service and the clock information from the FlexE frame includes: obtaining, by the second network device, the client service from a first bit in the code block, and obtaining the clock information from a second bit in the code block based on bit indication information. In this embodiment of the present invention, the client service and the clock information of the client service may be carried in a same code block and occupy different bits. The first network device notifies the second network device of the bit occupied by the client service and the bit occupied by the clock information by using the bit indication information, so that the second network device can obtain the clock information of the client service.

In a possible design, the bit indication information may be carried in an overhead code block of the FlexE frame.

In a possible design, the client service and the clock information occupy different timeslots, and the obtaining, by the second network device, the client service and the clock information from the FlexE frame includes: obtaining, by the second network device, the client service from a first timeslot in the FlexE frame, and obtaining the clock information from a second timeslot in the FlexE frame based on timeslot indication information. In this embodiment of the present invention, the first network device may randomly select the second timeslot to transmit the clock information of the client service, and notify the second network device of a location of the second timeslot by using the code block indication information, so that the second network device can find the second timeslot and obtain the clock information of the client service from the second timeslot.

In a possible design, the timeslot indication information may be carried in an overhead code block of the FlexE frame.

In a possible design, a period of adjusting the recovered clock based on the clock information is the same as a period of mapping the clock information to a timeslot of the FlexE frame.

According to a third aspect, an embodiment of the present invention provides a network device. The network device has a function of implementing actions of a first network device side or a second network device side in the foregoing method examples. The function may be implemented by using hardware, or may be implemented by hardware executing corresponding software. The hardware or software includes one or more modules corresponding to the foregoing function.

In a possible design, a structure of the network device includes a processor and a communications interface. The processor is configured to support the network device to execute a corresponding function in the foregoing method. The communications interface is configured to support communication between the network device and another network device. Further, the network device may further include a memory. The memory is configured to couple to the processor, and stores a necessary program instruction and necessary data of the network device.

According to a fourth aspect, an embodiment of the present invention provides a network system. The system includes the first network device and the second network device according to the foregoing aspects.

According to a fifth aspect, an embodiment of the present invention provides a computer storage medium, configured to store a computer software instruction used by the first network device and/or the second network device, and including a program designed to implement the foregoing aspects.

During implementation of the embodiments of the present invention, the first network device obtains the clock information of the client service, and maps the client service and the clock information of the client service to the FlexE frame. Therefore, after receiving the FlexE frame, the second network device may obtain, from the FlexE frame, the client service and the clock information corresponding to the client service, and adjust a recovered clock based on the clock information, so that the recovered clock approaches an original clock of the client service. Therefore, the client service is adapted from a clock of the FlexE frame to the original clock of the client service, so that the client service is efficiently carried in the FlexE frame, and the clock information is transparently transmitted.

These aspects or other aspects of the present invention are more comprehensible in descriptions of the following embodiments.

DESCRIPTION OF EMBODIMENTS

Technical solutions provided in the embodiments of the present invention may be applied to flexible Ethernet, or may be applied to other types of networks, for example, Ethernet, an optical transport network (OTN), and a synchronous digital hierarchy (SDH) network. In the embodiments of the present invention, flexible Ethernet is mainly used as an example for description.

Figure 1:
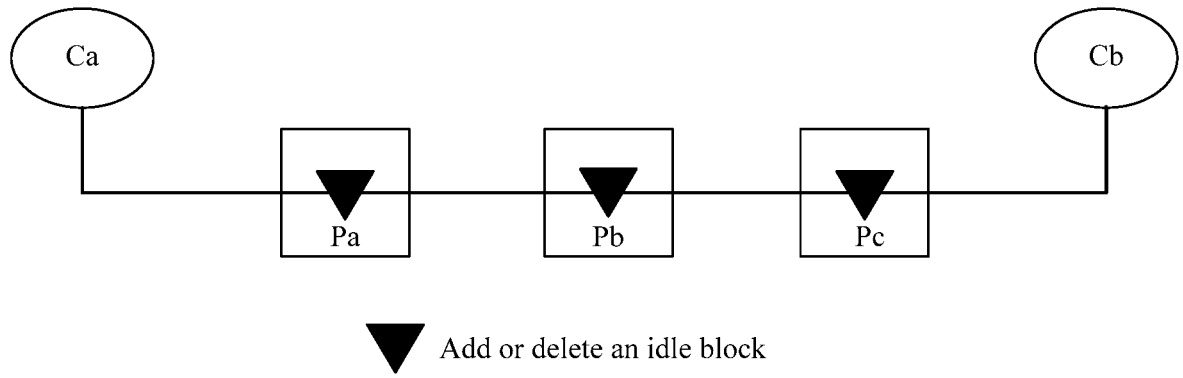
FIG. 1 is a schematic diagram of service transmission in flexible Ethernet in the prior art.
Figure 2:
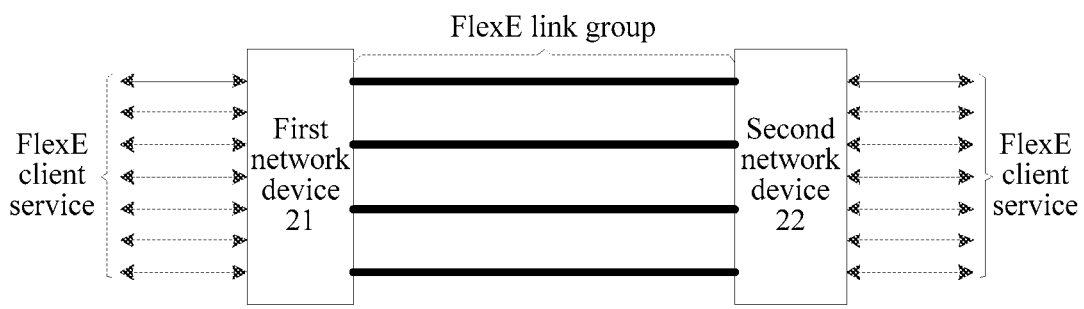
FIG. 2 is a schematic diagram of a FlexE architecture according to an embodiment of the present invention.

The technical solutions provided in the embodiments of the present invention may be applied to a FlexE network architecture shown in FIG. 2. The network architecture includes: a first network device 21 and a second network device 22.

A network device (for example, the first network device 21 and the second network device 22) may be a device having a data receiving and sending function, for example, a router and a switch. The network device may be referred to as a FlexE clientin the FlexE network architecture.

There is at least one FlexE group between the first network device 21 and the second network device 22, and each FlexE link group includes a plurality of links logically bundled. In the logical bundling, a physical connection relationship may not exist. Therefore, the plurality of links in the FlexE group may be physically independent. The link in this embodiment of the present invention may be a physical Ethernet link, for example, an optical fiber. In this embodiment of the present invention, a bandwidth provided by each link is not limited. The FlexE group includes 1 to n Ethernet physical layer devices (PHY). The FlexE client corresponds to an Ethernet Media Access Control (MAC) layer, and supports MAC rates of 10 G, 40 G, and 100 G and a MAC rate not mentioned in a FlexE standard. The first network device 21 may map a plurality of FlexE client services to a bound FlexE group. Correspondingly, the second network device 22 may demap the plurality of FlexE client services from the FlexE group. An example in which FlexE uses a PHY of 100 G is used for description. The PHY of 100 G may be divided into 20 timeslots at a granularity of 5 G. Correspondingly, each FlexE frame includes a FlexE overhead and 1023*20 timeslots (to be specific, in a FlexE frame, 20 timeslots appear repeatedly for 1023 times). Certainly, there may further be other granularities. Usually, there is one FlexE group between two network devices. However, this is not limited in this embodiment of the present invention, and there may alternatively be a plurality of FlexE groups between two network devices. A link may be used to carry at least one client service, and a client service may be transmitted on at least one link.

Figure 3:
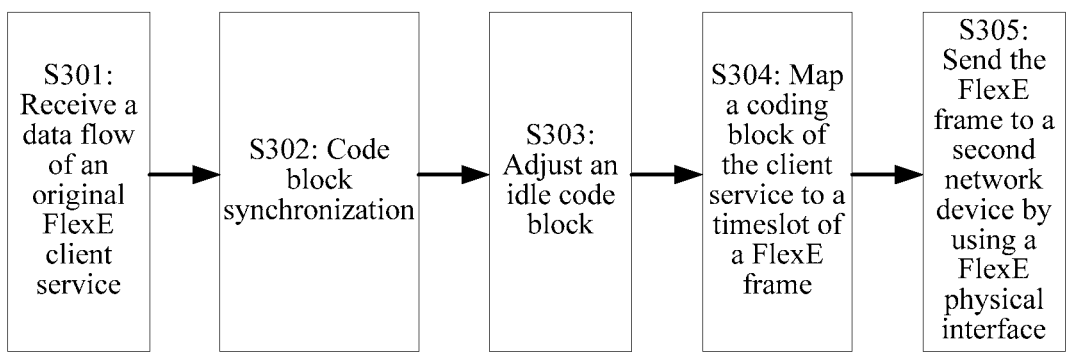
FIG. 3 is a schematic flowchart of data processing of a first network device according to an embodiment of the present invention.

FIG. 3 is a schematic flowchart of data processing of a first network device according to an embodiment of the present invention. As shown in FIG. 3, the first network device receives an original client service data stream (in step S301), and performs physical coding sublayer (PCS) processing and code block synchronization based on a type of the data stream and an Ethernet standard (in step S302). To be specific, N 8B/10B code blocks (where the client service is a GE signal or a 2.5 GE signal) or N 64B/66B code blocks (where the client service is a 10 GE signal, a 40 GE signal, a 25 GE signal, a 100 GE signal, or the like) are restored from the client service by using a code block synchronization technology. N is an integer greater than or equal to 1. If the client service is a GE signal or a 2.5 GE signal, after restoring the N 8B/10B code blocks from the client service, the first network device further needs to transcode the N 8B/10B code blocks to the N 64B/66B code blocks. Specifically, the 8B/10B code blocks are transcoded to the 64B/66B code blocks. In a transcoding process, the 10B code blocks may be first decoded to an 8-bit Gbps data stream on media independent interface (GMII), the 8-bit data stream on the GMII interface is converted to a 64-bit data stream on an Ethernet 100 G media independent interface (CGMII) interface, and 64B/66B encoding is performed on the 64-bit data stream on the CGMII interface to obtain the 66B code blocks. Then, an idle code block is adjusted (in step S303). To be specific, an idle code block is deleted or added to adapt a data rate of a FlexE service to a FlexE rate. It should be noted that a FlexE service signal is based on a MAC data rate that may be different from a PHY layer rate. When the FlexE service signal enters a FlexE shim layer, rate adaptation needs to be performed. In a FlexE technical standard, currently, FlexE mainly carries an Ethernet service and a rate of the Ethernet service changes. Therefore, when data needs to be transmitted sometimes, rate adaptation is implemented by adding or deleting an idle code block. For rate adaptation implemented by adding or deleting an idle code block, refer to the prior art. Then, the first network device maps a code block of the client service to a timeslot of a FlexE frame (in step S304). After a FlexE overhead is added and PCS sending is performed (scrambling, and lane allocation and alignment marker insertion), the code block is sent to a FlexE physical port (or interface group). The FlexE frame is sent to the second network device by using the FlexE physical interface (or interface group) (in step S305).

Figure 4:
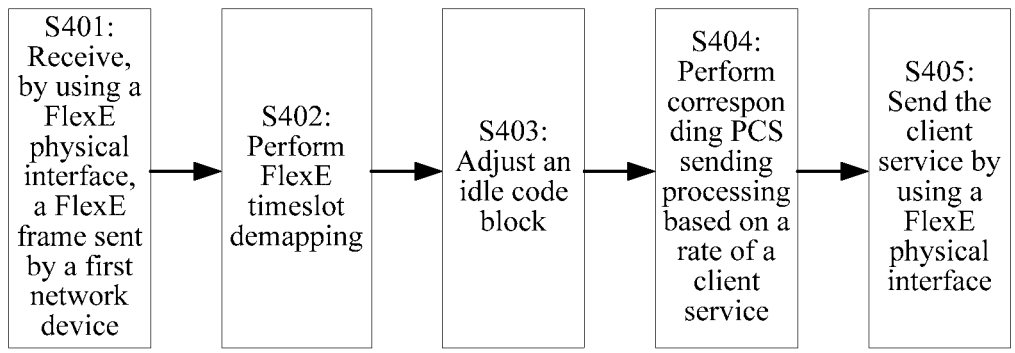
FIG. 4 is a schematic flowchart of data processing of a second network device according to an embodiment of the present invention.

FIG. 4 is a schematic flowchart of data processing of a second network device according to an embodiment of the present invention. As shown in FIG. 4, a second network device receives, by using a FlexE physical interface, a FlexE frame sent by a first network device (in step S401), and first performs PCS receiving processing (alignment marker synchronization, lane (lane) alignment, and descrambling) to find a 66B code block. Then, FlexE timeslot demapping is performed (in step S402). To be specific, a FlexE frame header is searched for, after the FlexE frame header is found, bandwidth indication information (Calendar) is extracted, and a timeslot in which the client service is located is found based on the calendar, to obtain the client service from a code block of the FlexE frame. Decoding (for example, 64B/66B decoding) is performed for the client service. Then, an idle code block is adjusted (in step S403). To be specific, an idle code block is added or deleted based on a data stream of the client service obtained after decoding, so that the client service is adapted from a FlexE clock to a recovered client clock. Subsequently, corresponding PCS sending processing is performed based on a client service rate (for example, alignment marker insertion processing is performed for a client service of 100 G) (in step S404). Then, the client service is sent by using a FlexE physical port (in step S405), so that the client service is sent to another client device.

Figure 5:
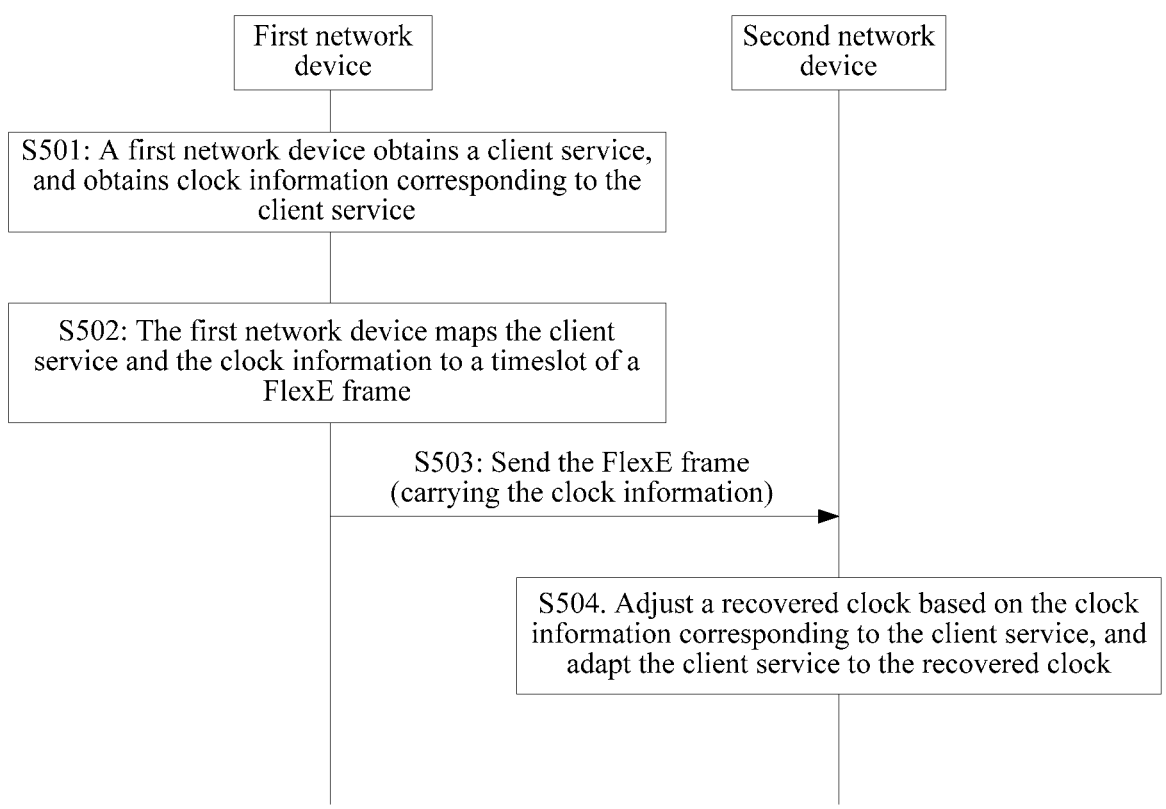
FIG. 5 is a flowchart of a service transmission method according to Embodiment 1 of the present invention.

However, adding or deleting of an idle code block results in clock information (including clock rate and time phase information) loss of the client service. To be specific, the clock rate and time phase information of the client service cannot be transparently transmitted. As a result, source and destination network devices of the client service cannot maintain clock rate and time phase synchronization. In view of this, in this embodiment of the present invention, the first network device transmits the clock information of the client service by using the FlexE frame, so that the clock information of the client service can be transparently transmitted in FlexE, and it is ensured that the source and destination network devices of the client service can maintain clock rate and time phase synchronization. A clock information transmission method described in an embodiment of the present invention is described below with reference to FIG. 5. FIG. 5 is a flowchart of a service transmission method according to Embodiment 1 of the present invention. As shown in FIG. 5, the method in this embodiment may include the following steps.

S501: A first network device obtains a client service, and obtains clock information corresponding to the client service.

In this embodiment of the present invention, the first network device obtains the client service to be transmitted, where the client service includes N code blocks. N is an integer greater than or equal to 1.

Specifically, after obtaining the client service to be transmitted, the first network device performs clock data recovery (CDR). The first network device needs to count a clock of the client service in each counting period to obtain the clock information corresponding to the client service. The clock information includes clock rate and time phase information of the client service. The counting period may be a FlexE system period or may be another phase discrimination period satisfying a system clock jitter requirement. The obtaining, by the first network device, clock information corresponding to the client service is specifically: obtaining a code block of the clock information, where a format of the code block includes any one of 64B/66B encoding, 8B/10B encoding, and 254B/256B encoding.

Figure 6:
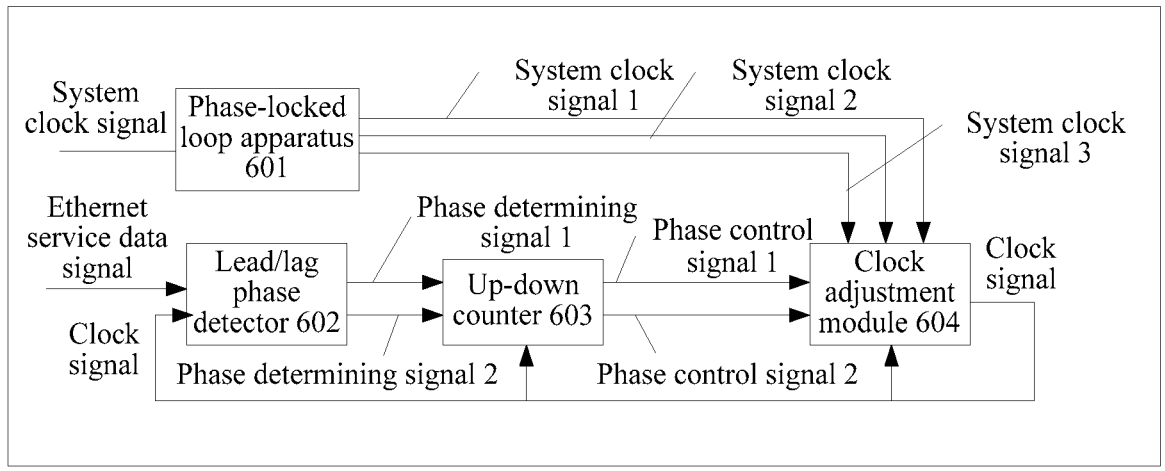
FIG. 6 is a schematic circuit diagram of recovering a clock of a client service according to an embodiment of the present invention.

Referring to FIG. 6, FIG. 6 is a schematic circuit diagram of recovering a clock of a client service. An objective of a clock recovery circuit is to extract, from an inputted data stream of the client service, a clock signal synchronizing with the data stream of the client service. Because it is impossible to generate the clock signal based on nothing, the circuit needs to have a clock signal generation mechanism. In addition, there needs to be a determining control mechanism that can be used to determine and adjust a phase relationship between the clock signal and an inputted service data stream, so that the clock signal and the inputted service data stream synchronize with each other. The clock recovery circuit mainly includes the following several modules: a phase-locked loop apparatus 601, a lead/lag phase detector 602, an up-down counter module 603, and a clock generation adjustment module 604. The phase-locked loop apparatus 601 may generate system clock signals having different phases, for example, a system clock signal 1, a system clock signal 2, or a system clock signal 3 in FIG. 6. The system clock signal 1 may be obtained by the phase-locked loop apparatus 601 by shifting a phase of a system clock signal by 0 degrees, the system clock signal 2 may be obtained by the phase-locked loop apparatus 601 by shifting a phase of the system clock signal by 60 degrees, and the system clock signal 3 may be obtained by the phase-locked loop apparatus 601 by shifting a phase of the system clock signal by 120 degrees. The lead/lag phase detector 602 may identify consecutive zeros and consecutive ones of an inputted client service signal. If a clock of the client service signal leads, a phase determining signal 2 (up-down) is a high level. If the clock of the client service signal lags, up-down is a low level. When the client service signal is consecutive zeros or consecutive ones, a phase determining signal 1 (valid) is a low level. In this case, up-down is invalid. This phase detector has only two states of lead and lag. If the up-down signal is directly outputted to control adjustment of a clock phase, clock switching is excessively frequent, and a glitch in an inputted signal causes a misoperation. Therefore, a signal outputted by the lead/lag phase detector 602 is sent to the up-down counter module 603, and a signal used to control clock phase adjustment is generated after accumulation over a particular period. The up-down counter module 603 performs a function of counting under control by an up-down signal sent by the lead/lag phase detector 602, to generate phase adjustment control signals (that is, a phase control signal 1 and a phase control signal 2 in FIG. 6). An initial value of the up-down counter module 603 is M. When the inputted signal valid is a high level, the signal up-down is determined. If the signal is 1, a count of the counter is increased. Otherwise, the count is decreased. When a value of the up-down counter module 603 is 2M, the phase control signal 2 (early) generates a high level pulse. When the value of the up-down counter module 603 is 0, the phase control signal 1 (later) generates a high level pulse. The clock adjustment module 604 mainly performs a function of generating a clock signal whose frequency is the same as that of the inputted client service signal, and constantly adjusting a phase of an outputted clock signal based on the phase adjustment control signal (that is, the phase control signal 1 and the phase control signal 2 in FIG. 6) sent by the up-down counter module 603, so that a rising edge of the outputted clock signal maintains in a center location of the inputted client service signal. When the clock adjustment module 604 detects that the signal early is a high level, the clock adjustment module 604 jumps to a state that leads a phase of a current clock signal by one phase (if the phase leads, continue to lead). When the clock adjustment module 604 detects that the signal later is a high level, the clock adjustment module 604 jumps to a state that lags behind the current clock signal by one phase (if the phase lags, continue to lag). Then, a corresponding system clock signal is selected as a current working clock, that is, an outputted clock signal, based on a current state. The outputted clock signal may be used by the lead/lag phase detector 601 to perform phase synchronization on the clock signal based on the inputted client service signal, so that the outputted clock signal and the inputted client service signal are finally synchronized. In addition, the outputted clock signal may alternatively be used as a period signal by the up-down counter module 603 and the clock adjustment module 604 in the foregoing processing process.

S502: The first network device maps the client service and the clock information of the client service to a timeslot of a FlexE frame.

In this embodiment of the present invention, the first network device maps N code blocks of the client service to the timeslot of the FlexE frame. Specifically, the first network device flexibly allocates, based on a rate of the client service, a timeslot to carry the client service, and the client rate of the client service is adapted to by adding or deleting an idle code block. In addition, the first network device further maps the clock information of the client service to a timeslot of the FlexE frame.

Specifically, to ensure that a clock of the client service is not lost, the first network device periodically inserts the clock information corresponding to the client service to particular FlexE code blocks based on the foregoing counting period. Locations of these particular code blocks do not change in a transmission process. The particular code block may be a fixed code block defined for transmitting the clock information in a FlexE standard. The particular code block may further be a code block randomly selected by the first network device. In this case, the first network device further needs to add a location of the code block selected to transmit the clock information to the FlexE frame, to notify the second network device. The location of the code block selected to transmit the clock information may be carried in a 66B overhead code block of the FlexE frame and transmitted to the second network device.

In an optional implementation, the client service and the clock information may occupy different code blocks of a same timeslot. For example, the client service occupies a first code block of the timeslot, the clock information occupies a second code block of the timeslot, and the first code block and the second code block may be indicated by using code block indication information. In this manner, the first network device may randomly select the second code block to transmit the clock information of the client service, and notify the second network device of a location of the second code block by using the code block indication information, so that the second network device can find the second code block and obtain the clock information of the client service from the second code block. Optionally, the code block indication information may be carried in an overhead code block of the FlexE frame and transmitted to the second network device.

Figure 7:
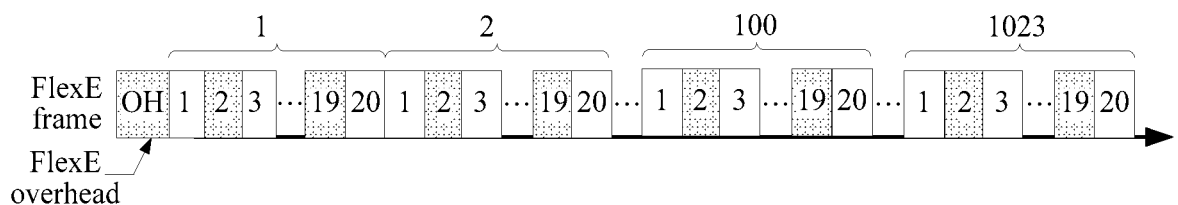
FIG. 7 is a schematic structural diagram of a FlexE frame according to an embodiment of the present invention.

For example, as shown in FIG. 7, FIG. 7 is a schematic structural diagram of a FlexE frame according to an embodiment of the present invention. A FlexE frame period includes a FlexE overhead code block and 1023*20 FlexE code blocks after the overhead code block. The 1023*20 FlexE code blocks are transmitted by using 20 timeslots repeating for 1023 times. The 20 timeslots repeating for 1023 times may be referred to as 20 timeslots. In this case, one timeslot corresponds to 1023 FlexE code blocks. For example, a timeslot 1 corresponds to 1023 code blocks marked as 1 in the figure. The 20 timeslots repeating for 1023 times may alternatively be referred to as 1023*20 timeslots. In this case, one timeslot corresponds to one FlexE code block. A reserved timeslot used to map to the client service is preset in the 20 timeslots repeating for 1023 times, and a location of the reserved timeslot is indicated by a calendar in a FlexE overhead. A FlexE standard may stipulate in advance a 66B code block that is in a client signal timeslot and that is used to transmit the clock information (where in this embodiment of the present invention, an example in which a length of the clock information is 64 bits is used for description, and the clock information may alternatively have other random lengths). The client signal timeslot is a timeslot that is indicated by the calendar and that is allocated to each client service. If the client service that needs to be transmitted by the first network device is a client service of 2.5 GE, 0.5 timeslot of 5 G is required to carry the client service. It is assumed that the first network device selects a first timeslot of 20 timeslots to transmit the client service of 2.5 GE, and the first network device selects a first to a $512^{th}$ code blocks in the first timeslot to transmit the client service of 2.5 GE, and selects a $513^{th}$ code block in the first timeslot to transmit the clock information of the client service of 2.5 GE. In this case, the first network device needs to notify the second network device of locations of the code blocks occupied by the client service of 2.5 GE and the code block occupied by the clock information of the client service of 2.5 GE. For example, the first network device adds location information of the code blocks occupied by the client service of 2.5 GE and the code block occupied by the clock information of the client service of 2.5 GE to an overhead code block of the FlexE frame and transmits the location information to the second network device.

For example, it is assumed that the first network device selects a first timeslot of 20 timeslots to transmit the client service of 2.5 GE, and the first network device selects a first to a $512^{th}$ code blocks in the first timeslot to transmit the client service of 2.5 GE, and selects a $513^{th}$ code block in the first timeslot to transmit the clock information of the client service of 2.5 GE. In this case, the first network device needs to notify the second network device of locations of the code blocks occupied by the client service of 2.5 GE and the code block occupied by the clock information of the client service of 2.5 GE. For example, the first network device adds location information of the code blocks occupied by the client service of 2.5 GE and the code block occupied by the clock information of the client service of 2.5 GE to an overhead code block of the FlexE frame and transmits the location information to the second network device.

In another optional implementation, the client service and the clock information may occupy a same code block of a same timeslot. For example, the client service occupies a first bit of the code block, the clock information occupies a second bit of the code block, and the first bit and the second bit are indicated by using bit indication information. In this manner, the client service and the clock information of the client service may be carried in a same code block and occupy different bits. The first network device notifies the second network device of the bit occupied by the client service and the bit occupied by the clock information by using the bit indication information, so that the second network device can obtain the clock information of the client service. Optionally, the bit indication information may be carried in an overhead code block of the FlexE frame.

For example, it is assumed that the first network device selects a first timeslot of 20 timeslot to transmit the client service, and the first network device selects first 32 bits of a first 66B code block in the first timeslot to transmit the client service, selects last 32 bits of the first 66B code block in the first timeslot to transmit the clock information of the client service, selects first 32 bits of a second 66B code block in the first timeslot to transmit the client service, and selects last 32 bits of the second 66B code block in the first timeslot to transmit the clock information of the client service. In this case, the first network device needs to notify the second network device of the bits occupied by the client service and the bits occupied by the clock information of the client service. For example, the first network device adds information about the bits occupied by the client service and the bits occupied by the clock information of the client service to an overhead code block of the FlexE frame, and transmits the information to the second network device.

In another optional implementation, the client service and the clock information may occupy different timeslots. For example, the client service occupies a first timeslot in the FlexE frame, the clock information occupies a second timeslot in the FlexE frame, and the first timeslot and the second timeslot are indicated by using timeslot indication information. In this manner, the first network device may randomly select a timeslot from the FlexE frame to transmit the clock information of the client service, and notify the second network device of a location of the timeslot by using the code block indication information, so that the second network device can find the second timeslot and obtain the clock information of the client service from the second timeslot. Optionally, the timeslot indication information may be carried in an overhead code block of the FlexE frame.

For example, it is assumed that the first network device selects a first timeslot of 20 timeslots to transmit the client service, and the first network device selects a second timeslot to transmit the clock information of the client service. In this case, the first network device needs to notify the second network device of the timeslot occupied by the client service and the timeslot occupied by the clock information of the client service. For example, the first network device adds information about the timeslot occupied by the client service and the timeslot occupied by the clock information of the client service to an overhead code block of the FlexE frame and transmits the information to the second network device.

In another optional implementation, timeslots occupied by the client service and the clock information may not be completely the same.

For example, the first network device may select a first to a 512th code blocks in a first timeslot of 20 timeslots to transmit the client service, and select last 32 bits of a 513th code block in the first timeslot and last 32 bits of a second code block in a second timeslot to transmit the clock information corresponding to the client service.

S503: The first network device sends the FlexE frame to a second network device.

In this embodiment of the present invention, the first network device sends the FlexE frame to the second network device. Correspondingly, the second network device receives the FlexE frame sent by the first network device.

S504. The second network device receives the FlexE frame sent by the first network device, adjusts a recovered clock based on the clock information corresponding to the client service, and adapts the client service to the recovered clock.

In this embodiment of the present invention, the second network device obtains, from the FlexE frame, N code blocks corresponding to the client service, obtains the client service from the obtained N code blocks, and obtains, from the FlexE frame, the clock information corresponding to the client service. The second network device adjusts the recovered clock based on the clock information.

Figure 8:
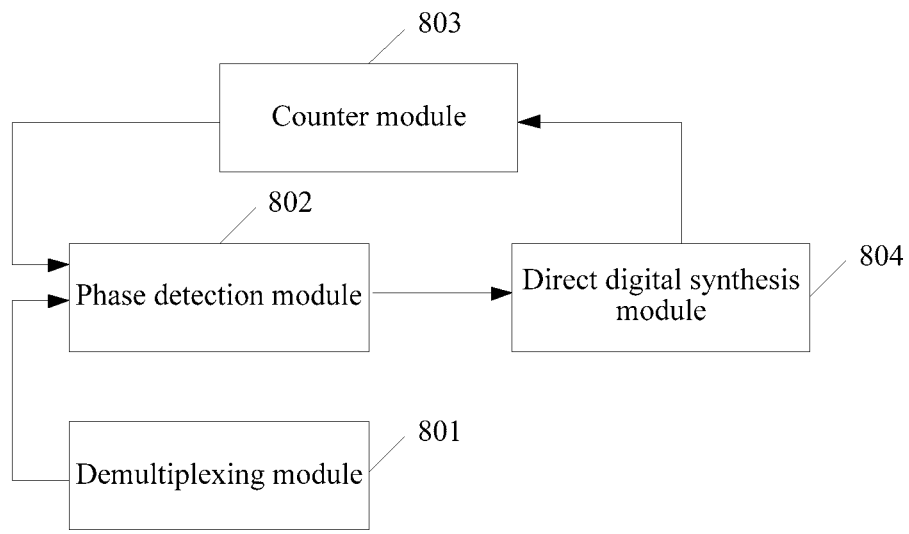
FIG. 8 is a schematic principle diagram of recovering clock information of a client service by a second network device according to an embodiment of the present invention.

Specifically, how the second network device recovers the clock information of the client service is described with reference to FIG. 8. A demultiplexing (demux) module 801 of the second network device extracts the clock information from the FlexE frame to obtain original clock information corresponding to the client service. The demux module 801 sends the obtained original clock information corresponding to the client service to a phase detection module 802. In a same counting period as that of the first network device, the phase detection module 802 compares the received original clock information sent by the demux module 801 with recovered clock information sent by a counter (Counter) module 803 to obtain a difference. A direct digital synthesis (DDS) module 804 controls adjustment of a rate of the recovered clock by using a phase detection result sent by the phase detection module 802, to recover the clock information of the client service. The DDS module 804 sends the recovered clock information to the counter (Counter) module 803. The counter module 803 counts a quantity of recovered clocks in the counting period to obtain the recovered clock information, and sends the recovered clock information to the phase detection module 802.

It should be noted that in this embodiment of the present invention, a counting period in which the first network device counts clocks of the client service (that is, a period in which the first network device obtains the clock information of the client service), a period in which the first network device inserts the clock information of the client service to the FlexE frame, and a period in which the second network device counts recovered clocks (that is, a period in which the second network device adjusts the recovered clock based on the clock information carried in the FlexE frame) are the same. This is because only the clock information calculated in a same time of the first network device and the second network device has commensurability. A period in which the clock information of the client service is inserted to the FlexE frame is also the same as the counting period. If the period in which the clock information of the client service is inserted to the FlexE frame is not the same as the counting period, the second network device requires the clock information of the first network device to perform phase detection when recovering a clock. However, the clock information sent by the first network device by using the FlexE frame may not arrive at this moment. If the second network device waits, it is late for the DDS module 804 to adjust a clock rate. In this way, a recovered clock may drift increasingly far away (the recovered clock is not promptly adjusted because of waiting). Finally, the recovered clock cannot satisfy a jitter indicator.

In this embodiment of the present invention, the second network device extracts the clock information corresponding to the client service from a particular code block for transmitting the clock information in the FlexE frame. The second network device counts recovered clocks of the client service in the same counting period as that of the first network device to obtain the recovered clock information, performs comparison and phase detection on the recovered clock information and the clock information extracted from the FlexE frame, and adjusts a rate of the recovered clock based on a phase detection result, to recover clock rate and phase information of the client signal. The second network device uses a recovered clock as a read clock of a random-access memory (RAM) for caching the client service, and adapts the client service to the recovered clock by adding or deleting an idle code block.

Subsequently, the second network device converts a 66B Ethernet code block to a data stream and sends the data stream based on a type of the client service and a standard sending processing procedure. If the data stream is of a service type of GE or 2.5 GE, a 64B/66B code block needs to be first transcoded to an 8B/10B code block and then sending processing is performed.

In conclusion, the first network device obtains the clock information of the client service, and maps the client service and the clock information of the client service to the FlexE frame. Therefore, after receiving the FlexE frame, the second network device may obtain, from the FlexE frame, the client service and the clock information corresponding to the client service, and adjust a recovered clock based on the clock information, so that the recovered clock approaches an original clock of the client service. Therefore, the client service is adapted from a clock of the FlexE frame to the original clock of the client service, so that the client service is efficiently carried in the FlexE frame, and the clock information is transparently transmitted.

In the client service transmission method provided in Embodiment 2 of the present invention, based on Embodiment 1 of the present invention, in this embodiment, how the first network device maps the clock information of the client service to a timeslot of the FlexE frame is described. The first network device may map the clock information corresponding to the client service to a particular code block of a timeslot used to transmit the client service. Specifically, a timeslot of 5 G of 20 timeslots in FlexE may be used, by multiplexing, to transmit the client service and the clock information corresponding to the client service. To be specific, some particular code blocks in a timeslot may be specially used to transmit data of the client service, and some other particular code blocks in the timeslot may be specially used to transmit the clock information corresponding to the client service. Correspondingly, in a feasible implementation of S504, the second network device obtains, from a particular code block that is in the FlexE frame and that is used to transmit the clock information, the clock information corresponding to the client service.

Figure 9:
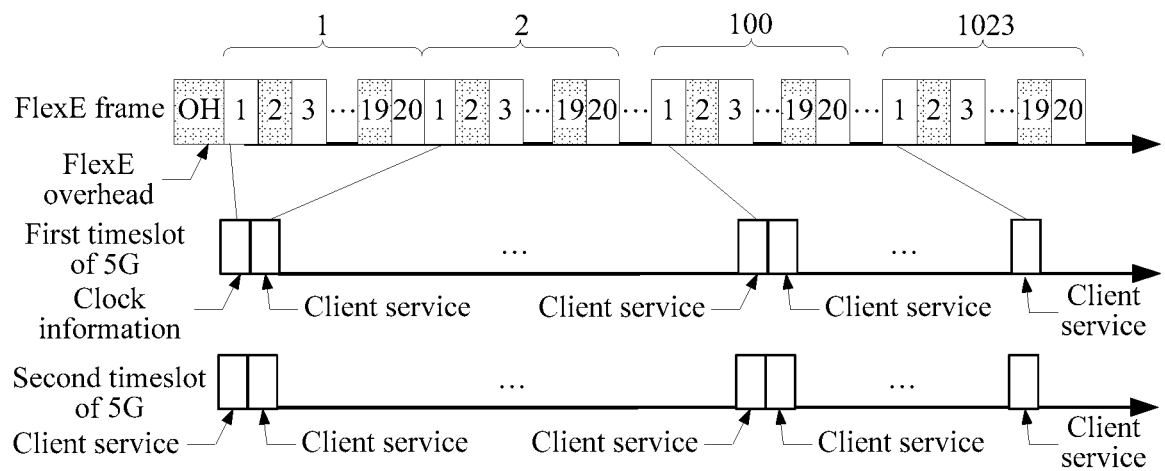
FIG. 9 is a schematic diagram of a mapping manner of clock information according to an embodiment of the present invention.

FIG. 9 is a schematic diagram of a mapping manner of clock information according to an embodiment of the present invention. As shown in FIG. 9, in a FlexE frame structure, a FlexE frame period includes a FlexE overhead code block and 1023*20 FlexE code blocks after the overhead code block. The 1023*20 FlexE code blocks are transmitted by using 20 timeslots repeating for 1023 times. The 20 timeslots repeating for 1023 times may be referred to as 20 timeslots. In this case, one timeslot corresponds to 1023 FlexE code blocks. For example, a timeslot 1 corresponds to 1023 code blocks marked as 1 in the figure. The 20 timeslots repeating for 1023 times may alternatively be referred to as 1023*20 timeslots. In this case, one timeslot corresponds to one FlexE code block. A reserved timeslot used to map to the client service is preset in the 20 timeslots repeating for 1023 times, and a location of the reserved timeslot is indicated by a calendar in a FlexE overhead. A FlexE standard may stipulate in advance a 66B code block that is in a client signal timeslot and that is used to transmit the clock information (where in this embodiment of the present invention, an example in which a length of the clock information is 64 bits is used for description). The client signal timeslot is a timeslot that is indicated by the calendar and that is allocated to each client service. For example, if the client service that needs to be transmitted by the first network device is a client service of 10 GE, 2 timeslots of 5 G are required to carry the client service. The two timeslots of 5 G are client signal timeslots. Alternatively, if the client service that needs to be transmitted by the first network device is a GE client service, one fifth of a timeslot of 5 G is required to carry the client service. The one fifth of a timeslot of 5 G is a client signal timeslot. It is assumed that a calendar indicates that a first timeslot of 5 G and a second timeslot of 5 G of 20 timeslots are used to transmit a client service of 10 GE, and a FlexE standard indicates that a first 66B code block in a client signal timeslot is used to transmit the clock information. In this case, the first network device may add the clock information corresponding to the client service of 10 GE to a first 66B code block in the first timeslot of 5 G, and add data corresponding to the client service of 10 GE to a code block other than the first code block in the first timeslot of 5 G and to a code block in the second timeslot of 5 G. Specifically, a location of the code block for carrying the client service may be indicated by a calendar. After receiving the FlexE frame sent by the first network device, based on stipulation of a FlexE standard, the second network device obtains, from the first 66B code block in the first timeslot of 5 G, the clock information corresponding to the client service of 10 GE. Certainly, the first network device may further add the clock information corresponding to the client service of 10 GE to another code block in the first timeslot of 5 G or add the clock information corresponding to the client service of 10 GE to a last 66B code block or another code block in the second timeslot of 5 G. This is not specifically limited in this embodiment of the present invention.

Alternatively, it is assumed that a calendar indicates that a first to a $512^{th}$ 66B code blocks in a first timeslot of 20 timeslots are used to transmit a client service of 2.5 GE, and a FlexE standard indicates that a first 66B code block in a client signal timeslot is used to transmit the clock information. In this case, the first network device may add the clock information corresponding to the client service of 2.5 GE to a first 66B code block in the first timeslot of 5 G, and add data corresponding to the client service of 2.5 GE to a code block other than the first code block in the first timeslot of 5 G. Specifically, a location of the code block for carrying the client service may be indicated by a calendar. After receiving the FlexE frame sent by the first network device, based on stipulation of a FlexE standard, the second network device obtains, from the first 66B code block in the first timeslot of 5 G, the clock information corresponding to the client service of 2.5 GE. Certainly, the first network device may further add the clock information corresponding to the client service of 2.5 GE to a last 66B code block or another code block in the first timeslot of 5 G. This is not specifically limited in this embodiment of the present invention.

In the client service transmission method provided in Embodiment 3 of the present invention, based on Embodiment 1 of the present invention, in this embodiment, how the first network device maps the clock information of the client service to a timeslot of the FlexE frame is described. The first network device may map the clock information corresponding to the client service to a particular code block of a timeslot used to transmit the client service. Specifically, several code blocks of a timeslot of 5 G of 20 timeslots in FlexE may be used, by multiplexing, to transmit the client service and the clock information corresponding to the client service. To be specific, some particular code blocks in a timeslot may be not only used to transmit data of the client service but also to transmit the clock information corresponding to the client service. Correspondingly, in a feasible implementation of S504, the second network device obtains, from a particular code block that is in the FlexE frame and that is used to transmit the clock information, the clock information corresponding to the client service.

Figure 10:
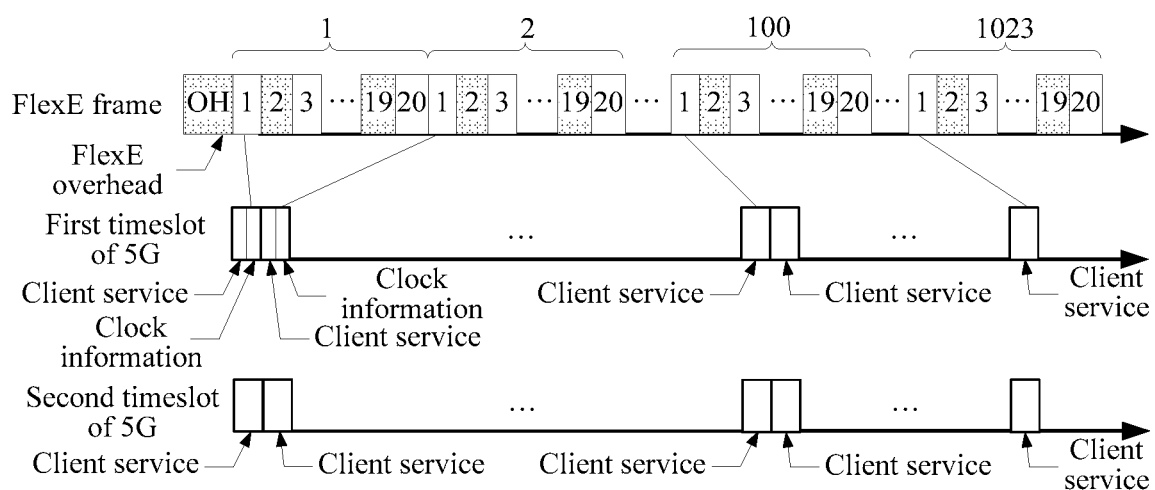
FIG. 10 is a schematic diagram of another mapping manner of clock information according to an embodiment of the present invention.

FIG. 10 is a schematic diagram of another mapping manner of clock information according to an embodiment of the present invention. As shown in FIG. 10, a FlexE standard may stipulate in advance that several 66B code blocks in a client signal timeslot are used to transmit data of a client service and clock information corresponding to the client service. It is assumed that a calendar indicates that a first timeslot of 5 G and a second timeslot of 5 G of 20 timeslots are used to transmit a client service of 10 GE, and a FlexE standard indicates that last 32 bits of a first 66B code block and last 32 bits of a second 66B code block in a client signal timeslot are used to transmit data of the client service and the clock information corresponding to the client service. In this case, the first network device may add the clock information corresponding to the client service of 10 GE to the last 32 bits of the first 66B code block in the first timeslot of 5 G and the last 32 bits of the second 66B code block in the first timeslot of 5 G. First 32 bits of the first 66B code block in the first timeslot of 5 G, first 32 bits of the first 66B code block in the second timeslot of 5 G, a code block other than the first 66B code block and the second 66B code block in the first timeslot of 5 G, and 1023 66B code blocks in the second timeslot of 5 G may be used to transmit the data of the client service. After receiving the FlexE frame sent by the first network device, based on stipulation of a FlexE standard, the second network device obtains, from the last 32 bits of the first 66B code block and the last 32 bits of the second 66B code block in the first timeslot of 5 G, the clock information corresponding to the client service of 10 GE. Certainly, the first network device may further add the clock information corresponding to the client service of 10 GE to last 32 bits of a last 66B code block and last 32 bits of a penultimate 66B code block in the second timeslot of 5 G. This is not specifically limited in this embodiment of the present invention.

In the client service transmission method provided in Embodiment 4 of the present invention, based on Embodiment 1 of the present invention, in this embodiment, how the first network device maps the clock information of the client service to a timeslot of the FlexE frame is described. The first network device may map the clock information corresponding to the client service to a preset timeslot. The preset timeslot is used to specially transmit the clock information, and the data of the client service is carried in another timeslot. Specifically, a timeslot of 5 G of 20 timeslots in FlexE may be used to specially transmit the clock information corresponding to the client service. To be specific, a timeslot for transmitting the data of the client service and a timeslot for transmitting the clock information corresponding to the client service are different. Correspondingly, in a feasible implementation of S504, the second network device obtains, from a timeslot block that is in the FlexE frame and that is used to transmit the clock information, the clock information corresponding to the client service.

Figure 11:
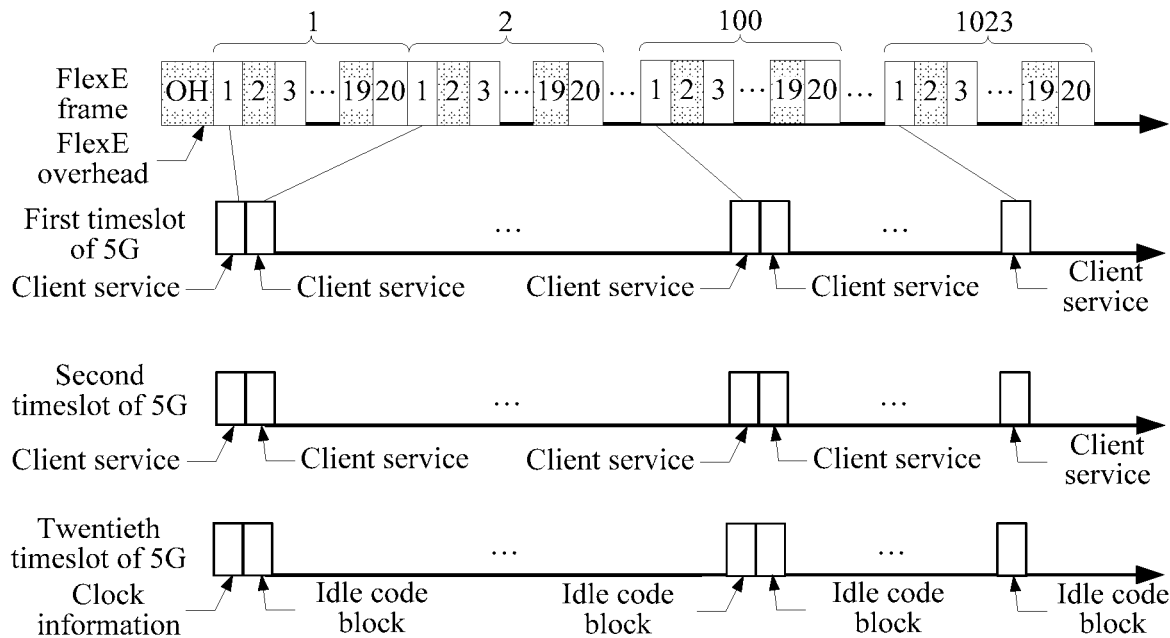
FIG. 11 is a schematic diagram of another mapping manner of clock information according to an embodiment of the present invention.

FIG. 11 is a schematic diagram of another mapping manner of clock information according to an embodiment of the present invention. As shown in FIG. 11, a FlexE standard may stipulate in advance that a timeslot of 20 timeslots is used to transmit clock information corresponding to a client service, and another timeslot may be used to transmit data of the client service. It is assumed that a calendar indicates that a first timeslot of 5 G and a second timeslot of 5 G of 20 timeslots are used to transmit a client service of 10 GE, and a FlexE standard indicates that a first 66B code block of a twentieth timeslot is used to transmit the clock information corresponding to the client service. In this case, the first network device may add the clock information corresponding to the client service of 10 GE to the first 66B code block in the twentieth timeslot of 5 G, and add the client service of 10 GE to the first timeslot of 5 G and the second timeslot of 5 G. After receiving the FlexE frame sent by the first network device, based on stipulation of a FlexE standard, the second network device obtains, from the first 66B code block in the twentieth timeslot of 5 G, the clock information corresponding to the client service of 10 GE. Certainly, the first network device may further add the clock information corresponding to the client service of 10 GE to a second timeslot of 5 G or another timeslot. This is not specifically limited in this embodiment of the present invention.

In the client service transmission method provided in Embodiment 5 of the present invention, based on Embodiment 1 of the present invention, in this embodiment, how the first network device maps the clock information of the client service to a timeslot of the FlexE frame is described. The first network device may map the clock information corresponding to the client service to a first code block randomly selected. The second network device is notified of a location of the first code block by using code block indication information. For example, the first network device maps the clock information corresponding to the client service of 10 GE to a first code block in a second timeslot of 5 G of 20 timeslots. In this case, the second network device needs to be notified, by using the code block indication information, that the first code block in the second timeslot of 5 G carries the clock information corresponding to the client service of 10 GE. Therefore, after receiving the FlexE frame, the second network device may determine, based on the code block indication information, that the clock information corresponding to the client service of 10 GE is obtained from the first code block in the second timeslot of 5 G.

The foregoing mainly describes the solutions in the embodiments of the present invention from the perspective of interaction between the first network device and the second network device. It may be understood that to implement the foregoing functions, a network device (for example, the first network device and the second network device) includes hardware structures and/or software modules corresponding to execution of the functions. With reference to examples of units, algorithms, and steps described in the embodiments disclosed in the present invention, the embodiments of the present invention can be implemented by hardware or hardware combining with computer software. Whether a function is performed by hardware or hardware driven by computer software depends on particular applications and design constraints of the technical solutions. A person skilled in the art can use different methods to implement the described functions for each particular application, but it should not be considered that the implementation exceeds the scope of the technical solutions in the embodiments of the present invention.

In the embodiments of the present invention, functional units of the network device (for example, the first network device and the second network device) may be classified based on the foregoing method embodiments. For example, functional units may be classified in correspondence to functions, or two or more functions may be integrated in one processing unit. The integrated unit may be implemented in a form of hardware, or may be implemented in a form of a software functional unit. It should be noted that in this embodiment of the present invention, unit division is an example and is only logical function division. There may be other division manners in an actual implementation.

Figure 12A:
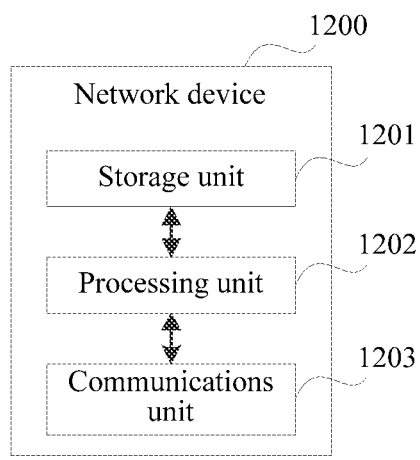
FIG. 12A is a schematic structural diagram of a network device according to an embodiment of the present invention.

When an integrated unit is used, FIG. 12A is a possible schematic structural diagram of the network device in the foregoing embodiment. A network device 1200 includes: a processing unit 1202 and a communications unit 1203. The processing unit 1202 is configured to control and manage operations of the network device 1200. For example, the processing unit 1202 is configured to support the network device 1200 to perform steps 501, 502, and 504 in FIG. 5, and/or is configured to perform other steps in the technology described in this specification. The communications unit 1203 is configured to support the network device 1200 to communicate with another network device. For example, the communications unit 1203 is configured to support the network device 1200 to perform step 503 in FIG. 5, and/or is configured to perform other steps in the technology described in this specification. The network device 1200 may further include a storage unit 1201, configured to store program code and data of the network device 1200.

The processing unit 1202 may be a processor or a controller, for example, may be a central processing unit (CPU), a general-purpose processor, a digital signal processor (DSP), an application-specific integrated circuit (ASIC), a field programmable gate array (FPGA), or other programmable logical devices, transistor logical devices, and hardware components, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications unit 1203 may be a communications interface, a transceiver, a transceiver circuit, or the like. The communications interface is a general term, and may include one or more interfaces, for example, an interface between the first network device and the second network device. The storage unit 1201 may be a memory.

Figure 12B:
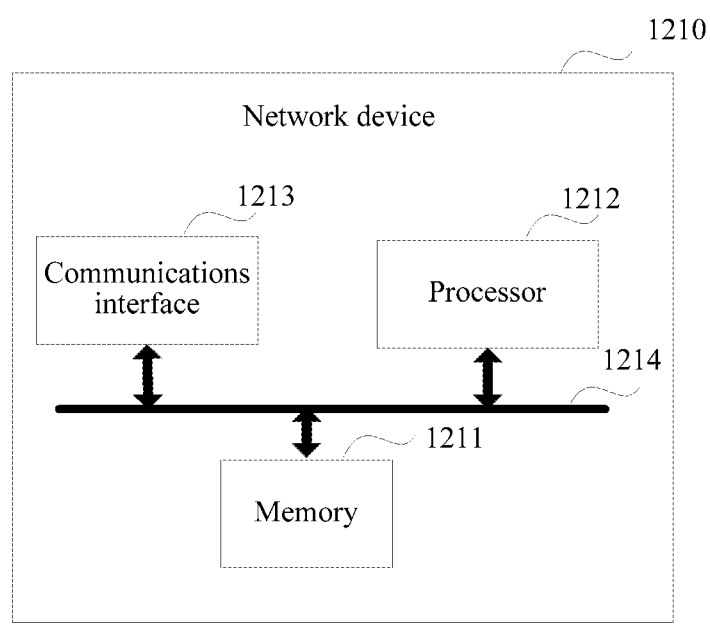
FIG. 12B is a schematic structural diagram of another network device according to an embodiment of the present invention.

When the processing unit 1202 is a processor, the communications unit 1203 is a communications interface, and the storage unit 1201 is a memory, a network device in this embodiment of the present invention may be the network device shown in FIG. 12B.

Referring to FIG. 12B, the network device 1210 includes: a processor 1212, a communications interface 1213, and a memory 1211. Optionally, the network device 1210 may further include a bus 1214. The communications interface 1213, the processor 1212, and the memory 1211 may be connected to each other by using the bus 1214. The bus 1214 may be a peripheral component interconnect (PCI) bus, an extended industry standard architecture (EISA) bus, or the like. The bus 1214 may be classified into an address bus, a data bus, a control bus, and the like. For ease of representation, only one thick line is used to represent the bus in FIG. 12B, but this does not mean that there is only one bus or only one type of bus.

The network device shown in FIG. 12A or FIG. 12B may be the first network device or the second network device.

Methods or algorithm steps described in combination with the content disclosed in this embodiment of the present invention may be implemented by hardware, or may be implemented by a processor by executing a software instruction. The software instruction may be formed by a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any storage medium in another form well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the network device. Certainly, the processor and the storage medium may alternatively exist in the network device as discrete assemblies.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present inven-

What is claimed is:

1. A service transmission method, comprising:
obtaining, by a first network device, a client service of flexible Ethernet (FlexE), and obtaining clock information corresponding to the client service;
mapping, by the first network device, the client service and the clock information to a timeslot of a FlexE frame, wherein the client service and the clock information occupy a same timeslot and/or different timeslots, wherein the client service occupies a first code block, the clock information occupies a second code block, and the first code block and the second code block are indicated by using code block indication information; and
sending, by the first network device, the FlexE frame to a second network device.

2. The method according to claim 1, wherein that the client service and the clock information occupy a same timeslot comprises:
the client service and the clock information occupy a same code block of the same timeslot; and
that the client service and the clock information occupy a same code block of the same timeslot comprises:
the client service occupies a first bit of the code block, the clock information occupies a second bit of the code block, and the first bit and the second bit are indicated by using bit indication information.

3. The method according to claim 1, wherein that the client service and the clock information occupy different timeslots comprises:
the client service occupies a first timeslot, the clock information occupies a second timeslot, and the first timeslot and the second timeslot are indicated by using timeslot indication information.

4. The method according to any one of claim 1, wherein the obtaining clock information corresponding to the client service comprises:
obtaining a code block of the clock information, wherein a format of the code block comprises 64B/66B encoding.

5. A service transmission method, comprising:
receiving, by a second network device, a flexible Ethernet (FlexE) frame sent by a first network device, wherein a timeslot of the FlexE frame comprises a client service of FlexE and clock information corresponding to the client service, and the client service and the clock information occupy a same timeslot and/or different timeslots;
obtaining, by the second network device, the client service and the clock information from the FlexE frame, and obtaining, by the second network device, the client service from a first code block, and obtaining the clock information from a second code block in the timeslot based on code block indication information; and
adjusting, by the second network device, a recovered clock based on the clock information, and adapting the client service to the recovered clock.

6. The method according to claim 5, wherein the client service and the clock information occupy a same code block in a same timeslot, and the obtaining, by the second network device, the client service and the clock information from the FlexE frame comprises:
obtaining, by the second network device, the client service from a first bit in the code block, and obtaining the clock information from a second bit in the code block based on bit indication information.

7. The method according to claim 5, wherein the client service and the clock information occupy different timeslots, and the obtaining, by the second network device, the client service and the clock information from the FlexE frame comprises:
obtaining, by the second network device, the client service from a first timeslot in the FlexE frame, and obtaining the clock information from a second timeslot in the FlexE frame based on timeslot indication information.

8. A network device comprising: a processor and a communications interface; and the processor is coupled with the communications interface, wherein:
the processor is configured to: obtain a client service of flexible Ethernet (FlexE), and obtain clock information corresponding to the client service;
the processor is further configured to map the client service and the clock information to a timeslot of a FlexE frame, wherein the client service and the clock information occupy a same timeslot and/or different timeslots, and wherein the client service occupies a first code block of the timeslot, the clock information occupies a second code block of the timeslot, and the first code block and the second code block are indicated by using code block indication information; and
the communications interface is configured to send the FlexE frame to a second network device.

9. The network device according to claim 8, wherein that the client service and the clock information occupy a same timeslot comprises:
the client service and the clock information occupy a same code block of the same timeslot; and
that the client service and the clock information occupy a same code block of the same timeslot comprises:
the client service occupies a first bit of the code block, the clock information occupies a second bit of the code block, and the first bit and the second bit are indicated by using bit indication information.

10. The network device according to claim 8, wherein that the client service and the clock information occupy different timeslots comprises:
the client service occupies a first timeslot, the clock information occupies a second timeslot, and the first timeslot and the second timeslot are indicated by using timeslot indication information.

11. The network device according to claim 8, wherein the processor is further configured to obtain clock information corresponding to the client service comprises:
obtaining a code block of the clock information, wherein a format of the code block comprises 64B/66B encoding.

12. The network device according to claim 8, wherein a period of obtaining the clock information corresponding to the client service is the same as a period of mapping the clock information to the timeslot of the FlexE frame.

13. A network device, comprising: a processor and a communications interface that is coupled with the processor; and
the communications interface is configured to receive a flexible Ethernet (FlexE) frame sent by a first network device, wherein a timeslot of the FlexE frame comprises a client service of FlexE and clock information corresponding to the client service, and the client service and the clock information occupy a same timeslot and/or different timeslots, wherein the client service occupies a first code block, the clock information occupies a second code block, and the first code block and the second code block are indicated by using code block indication information;

the processor is configured to obtain the client service and the clock information from the FlexE frame; and the processor is further configured to: adjust a recovered clock based on the clock information, and adapt the client service to the recovered clock.

14. The network device according to claim 13, wherein the client service and the clock information occupy a same code block in a same timeslot, and the processor being configured to obtain the client service and the clock information from the FlexE frame comprises:

obtaining the client service from a first bit in the code block, and obtaining the clock information from a second bit in the code block based on bit indication information.

15. The network device according to claim 13, wherein the client service and the clock information occupy different timeslots, and the processor being configured to obtain the client service and the clock information from the FlexE frame comprises:

obtaining the client service from a first timeslot in the FlexE frame, and obtaining the clock information from a second timeslot in the FlexE frame based on timeslot indication information.

16. The network device according to claim 13, wherein a period of adjusting the recovered clock based on the clock information is the same as a period of mapping the clock information to a timeslot of the FlexE frame.

\* \* \* \* \*